| (12) | United States Patent<br>Swiegot et al. | (10) Patent No.: US 10,997,742 B2<br>(45) Date of Patent: *May 4, 2021 |
|---|---|---|

(54) ABSOLUTE POSITION DETECTION

(71) Applicant: Sage Vision Inc., Milton, MA (US)

(72) Inventors: Elmar Swiegot, Wertheim (DE); Alan Shinn, Berkeley, CA (US); Chiko Fan, San Jose, CA (US); David King, Pleasanton, CA (US); Elias Elias, Milton, MA (US)

(73) Assignee: Sage Vision Inc., Milton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,171

(22) Filed: Jan. 30, 2018

(65) Prior Publication Data

US 2019/0035102 A1 Jan. 31, 2019

Related U.S. Application Data

(63) Continuation of application No. 13/918,704, filed on Jun. 14, 2013, now abandoned.

(60) Provisional application No. 61/678,581, filed on Aug. 1, 2012, provisional application No. 61/660,614, filed on Jun. 15, 2012.

(51) Int. Cl.
*G06T 7/60* (2017.01)
*G06T 7/73* (2017.01)

(52) U.S. Cl.
CPC .............. *G06T 7/60* (2013.01); *G06T 7/73* (2017.01); *G06T 2207/10024* (2013.01)

(58) Field of Classification Search
CPC ..... G06T 7/004; G06T 7/0042; G06T 7/0046; G01B 7/02

USPC .......... 348/135, 141; 356/498, 496
See application file for complete search history.

(56) References Cited

U.S. PATENT DOCUMENTS

| 5,978,418 | A  | * | 11/1999 | Greve   | G01D 5/34792<br>356/498 |
|---|---|---|---|---|---|
| 6,664,535 | B1 | * | 12/2003 | Nahum   | G01D 5/34792<br>250/231.14 |
| 6,765,195 | B1 | * | 7/2004  | Leviton | G01D 5/347<br>250/231.13 |
| 7,408,654 | B1 | * | 8/2008  | Hardin  | G01D 5/34707<br>33/707 |
| 9,030,554 | B2 | * | 5/2015  | Pichon  | G01N 21/958<br>348/136 |
| 2008/0111063 | A1 | * | 5/2008 | Otsuka | G01D 5/34792<br>250/237 G |

(Continued)

*Primary Examiner* — Joseph G Ustaris
*Assistant Examiner* — Jimmy S Lee
(74) *Attorney, Agent, or Firm* — Morrison & Foerster LLP

(57) ABSTRACT

A system for determining the absolute position of a first object with respect to a second object includes a scalar element attached to the first object and a measuring device attached to the second object. The scalar element comprises a series of coded regions. The coded region represents a number designating a position along an axis of the scalar element. The measuring device includes a two-dimensional optical sensor array configured to capture an image of a portion of the scalar element. The system also includes a processor configured to receive the image and determine an absolute position of the first object with respect to the second object based on at least one coded region of the series of coded regions.

12 Claims, 9 Drawing Sheets

(56) References Cited

U.S. PATENT DOCUMENTS

2011/0187855 A1* 8/2011 Pichon ............... G01B 11/2513
348/136

* cited by examiner

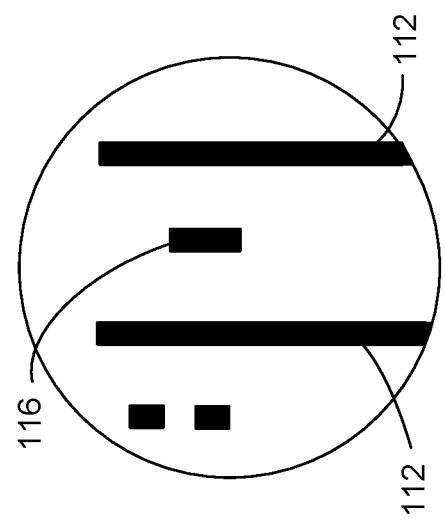
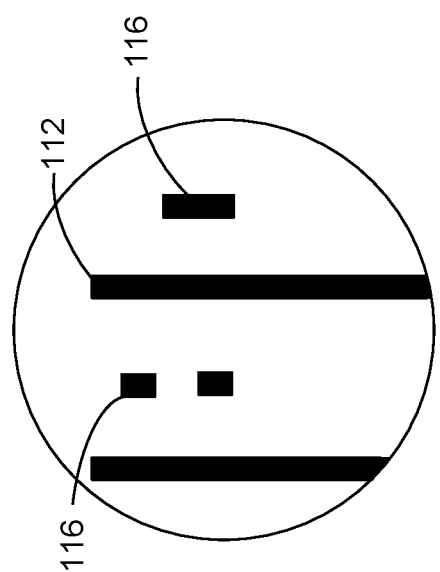
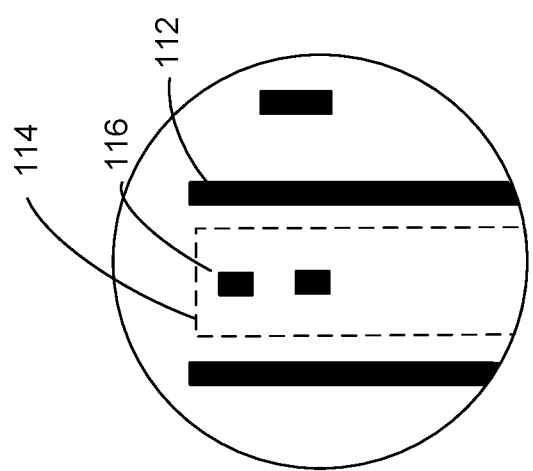

| Decimal | Binary | Graphical Representation |
|---|---|---|
| 0 | 00000000 | |
| 1 | 00000001 |  |
| 2 | 00000010 |  |
| 3 | 00000011 |  |
| 4 | 00000100 |  |
| 5 | 00000101 |  |
| 6 | 00000110 |  |
| 7 | 00000111 |  |
| 8 | 00001000 |  |
| * * * | | |
| 254 | 11111110 |  |
| 255 | 1111111 |  |
FIG. 9

ABSOLUTE POSITION DETECTION

CROSS REFERENCE TO RELATED APPLICATIONS

This application is a Continuation of U.S. patent application Ser. No. 13/918,704, filed Jun. 14, 2013, which claims the benefit under 35 USC 119(e) of prior U.S. Provisional Patent Application No. 61/678,581, filed Aug. 1, 2012, and prior U.S. Provisional Patent Application No. 61/660,614, filed Jun. 15, 2012, each which is hereby incorporated by reference in their entirety.

BACKGROUND

Field

The present disclosure relates generally to determining absolute position along an axis of motion, and more specifically to viewing an optically readable scalar element with a two-dimensional sensor array and determining an absolute position along the axis of motion.

2. Description of Related Art

Relative distance along an axis can be measured using a traditional optical scale. A traditional optical scale may include a series of regularly repeating index marks set apart by a pitch that is a known distance. A relative distance or the position of an object along the scale can be determined by counting the number of index marks and multiplying the count by the known distance of the pitch.

A traditional optical scale can be used to measure the relative motion between two objects. For example, a traditional optical scale may be attached to a first object in a location that can be viewed with respect to a reference point or indicator on a second object. The position of the second object can be measured with respect to the reference point by counting the number of index marks that pass the reference point. Using this technique, the position along an axis can be measured by determining an absolute home location, usually at one end of the scale, and then counting the number of index marks from the home location. The index count can be stored in computer memory and incremented or decremented depending on the movement of the second object.

One disadvantage to using a traditional scale is that the position of the second object cannot be determined if the index count is lost or accumulates errors. For example, if the index count is lost due to an electrical reset or loss of power, the position of the second object cannot be determined without returning to the home location. Similarly, the index count may be lost if the second object is removed from the first object and returned in a different position along the axis. Because the index count was not incremented or decremented while the second object was removed, the relative position of the second object stored in computer memory is no longer correct. Additionally, errors in the index count can accumulate over time and result in a reported position that is inaccurate.

What is needed is a technique for determining absolute position along an axis of motion without the disadvantages of a traditional optical scale.

BRIEF SUMMARY

The embodiments described herein include a measurement system for measuring the absolute position of a first object with respect to a second object along an axis of motion. The system comprises a scalar element attached to the first object. The scalar element comprises a series of coded regions, each coded region of the series of coded regions having information encoded along a direction perpendicular to the axis of motion. The coded region represents a number designating a position along an axis of the scalar element. A measuring device is attached to the second object and includes a two-dimensional optical sensor array configured to capture an image of a portion of the scalar element. A processor is configured to receive the image and determine an absolute position of the first object with respect to the second object based on one coded region of the series of coded regions. In some embodiments, the two-dimensional optical sensor array is a camera sensor.

In some embodiments, each coded region of the series of coded regions is a binary code that represents a number designating a position along an axis of the scalar element. In some embodiments, the system also includes a display configured to display the absolute position to a user. The system may also include a motion controller configured to receive the absolute position, and to cause a movement of the first object along the axis of motion based on the received absolute position.

In some embodiments, the measuring device is configured to capture a plurality of images as the first or second object move along the axis of motion and the processor is configured to determine, in real time, an absolute position for each of the plurality of images.

In some embodiments, each coded region comprises a colored region, and the processor is further configured to determine an absolute position of the first object with respect to the second object based on the colored region. In some cases, each coded region comprises more than one colored regions, and the processor is further configured to determine an absolute position of the first object with respect to the second object based on the more than one colored region.

The embodiments described herein include a measurement system for measuring the absolute position of a first object with respect to a second object. The system comprises a scalar element attached to the first object and a measuring device attached to the second object. In one embodiment, the scalar element comprises a series of regularly repeating optically readable index lines, and a series of coded regions, each coded region of the series of coded regions disposed between two index lines of the series of index lines. The coded region represents a number designating a position along an axis of the scalar element. In another embodiment, only the coded regions are provided.

The measuring device includes a two-dimensional optical sensor array configured to capture an image of a portion of the scalar element. The system also includes a processor configured to receive the image and determine an absolute position of the first object with respect to the second object. In one embodiment, the position is based on at least one index line of the series of index lines and at least one coded region of the series of coded regions. Where only coded regions are provided, the position is based on an image of a coded region.

DESCRIPTION OF THE FIGURES

FIGS. 3A-C depicts portions of a scalar element.

FIG. 9 depicts a table showing an exemplary binary coding scheme using a graphical representation of binary numbers in a sequence

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The following embodiments relate to the measurement of an absolute position between two objects that are capable of moving with respect to each other, at least with respect to one axis. One object may be fixed with respect to ground and the other object may move along an axis of motion. The objects may be moved manually or may be driven by motor or other electromechanical device.

Figure 1:
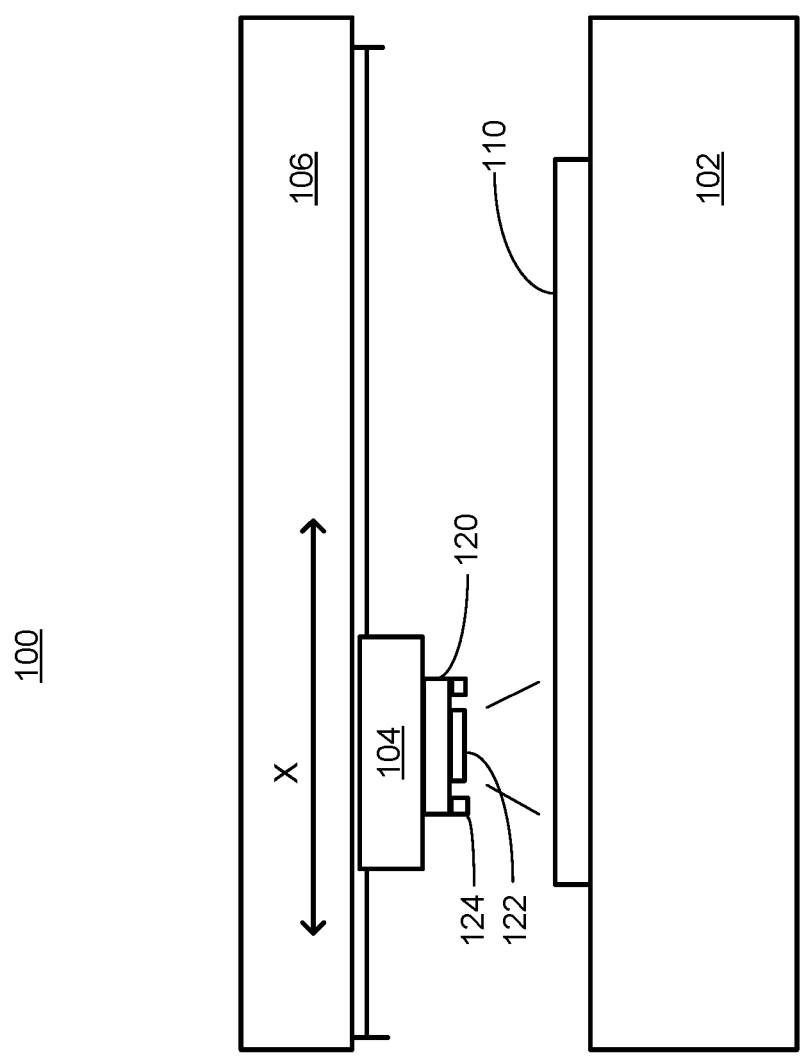
FIG. 1 depicts a system for determining an absolute position.

One exemplary embodiment is depicted in the measurement system of FIG. 1. The measurement system 100 includes a first object 102 and a second object 104. In the present embodiment, the first object 102 is fixed with respect to ground and the second object 104 is able to move along the an axis (the x-axis). The second object 104 may be constrained by a rail or mechanical guide attached to a third object 106, which is fixed with respect to ground. The range of motion of the second object 104 may be limited by hard stops on either end of the third object 106.

A scalar element 110 is attached to the top face of the first object 102. An exemplary scalar element 110 is described in more detail below with respect to FIG. 2. A measuring device 120 is attached to the bottom face of the second object 104 and disposed above the scalar element 110. In the present embodiment, the measuring device 120 remains disposed over the scalar element 110 throughout the range of motion of the second object 104.

The measuring device 120 includes a two-dimensional optical sensor array 122 for capturing an image of a portion of the scalar element 110. Specifically, the optical sensor array 122 has an optical field of view that is sufficiently wide to view one or more optical features of the scalar element 110. In the present embodiment, the optical sensor array 122 is a charge-coupled device (CCD) capable of producing an electrical signal in response to light incident to the surface of the CCD. The measuring device 120 may include one or more optical elements (e.g. lenses) for focusing light onto the CCD. The measuring device 120 may also include one or more lighting elements 124 for illuminating the surface of the scalar element 110. For example, the lighting elements 124 may include one or more light emitting diodes (LEDS) configured to emit an illuminating light over the portion of the scalar element 110. The measuring device 120 is a capable of producing an image of a portion of the scalar element 110 and output the image as an array of pixel values.

The measuring device 120 may also include or be operatively coupled to one or more processors for interpreting the array of pixel values and determining an absolute position of the second object 104 with respect to the first object 102. A more detailed discussion of the image processing technique is provided below with respect to process 1000 depicted in FIG. 6.

Figure 2:
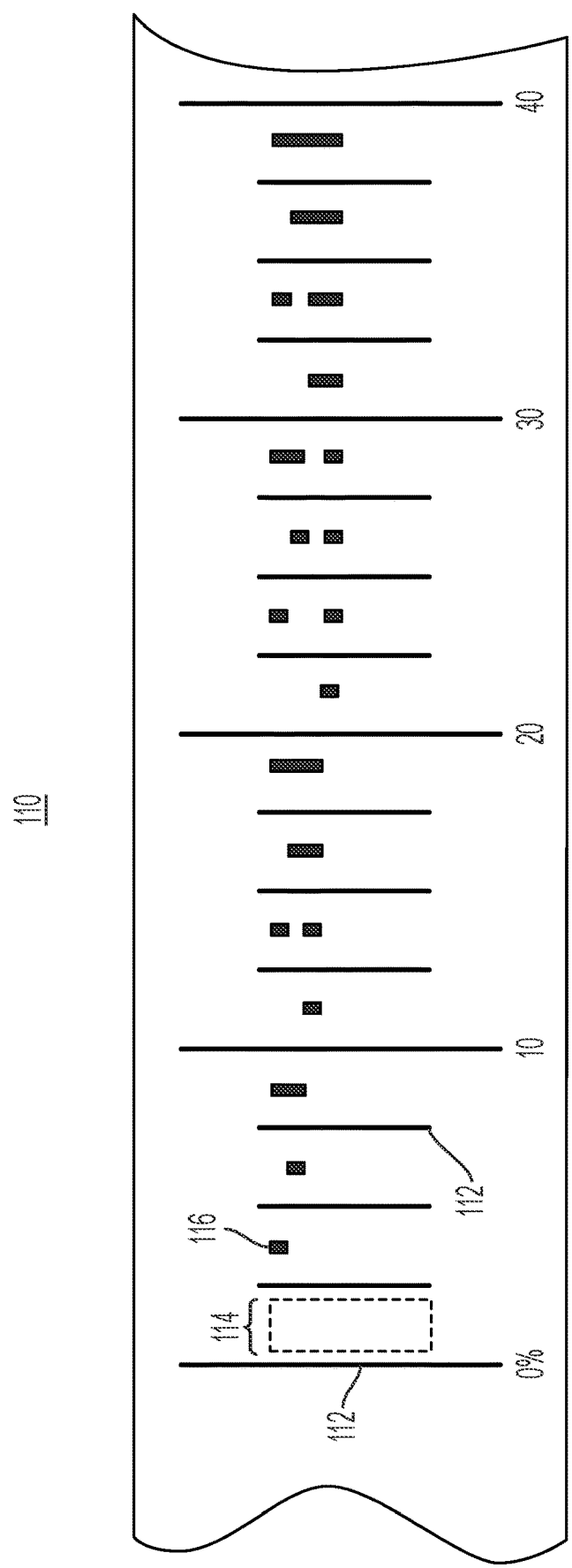
FIG. 2 depicts an exemplary embodiment of a scalar element.

FIG. 2 depicts a top view of an exemplary scalar element 110. The scalar element 110 includes a series of regularly repeating optically readable index lines 112. In the present embodiment, the index lines 112 are vertical lines spaced at a 0.7 mm pitch. The scalar element 110 also includes a series of coded regions 114 disposed between each pair of index lines 112. In the present embodiment, the coded region 114 includes a binary code 116, which represents a number value designating an absolute position of the binary region with respect to the scalar element 110.

In one embodiment, the each binary code 116 represents a value designating the number of units of a known distance (or number of index lines 112 having a known spacing) from a home location on the scalar element 110. In FIG. 2, the home location is represented by the index line labeled 0%. Starting from the left, the first coded region includes a binary code representing the number value 0, indicating the starting location or home position. The next coded region to the right of the first coded region includes a binary code representing the number value 1, indicating that this location is spaced from the home position by one known distance unit. Similarly, each coded region 114 of the series of coded regions includes a binary code 116 representing a value that indicates the number of units of a known distance (or the number of index lines 112 having a known spacing) between the coded region 114 and the home location.

The embodiment depicted in FIG. 2 is exemplary and other techniques could be used to designate a number value within the coded regions. For example, in an alternative embodiment, the coded regions could include a shaded region having a grey scale value or color value that represents a number value indicating the number of units of distance from a particular location on the scalar element 110. In another alternative embodiment, the coded region could include a both a binary code and a grey scale value or color value that represents a number value. The coded region may also include other information, such as error correction bits or optical reference marks used to register an image.

Since the binary code 116 can be used to represent a number of units of distance from the origin, the system does not require index lines 112. In practice, index lines are preferable since they provide a simple way of extending the length of the scale by a factor of two. Also, the index lines have a high contrast that can be more easily measured. It should be noted that the extended length index lines depicted in FIG. 2 (corresponding to the numbers 0, 10, 20, 30, and 40) are not required and are used to aid human observation.

Note also that it is possible that the binary code 116 can be arranged to correspond to an actual, absolute total distance from the origin rather than a unit distance multiplier.

In FIG. 2, the pattern on the scalar element is arranged along a straight line and attached to a flat surface. In alternative embodiments, the pattern on the scalar element could be arranged along a curve and the scalar element could be attached to an arced, helical, or other topographically shaped surface.

As discussed above, the measuring device 120 includes a two-dimensional optical sensor array configured to capture an image of a portion of the scalar element 110. With respect to the present embodiment, the two-dimensional optical sensor array is a black and white CCD camera sensor coupled with an optical element configured to produce an image representing an approximately 0.7 mm square portion of the scalar element 110.

Figure 4C:
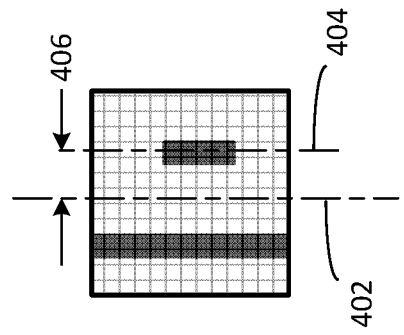
FIGS. 4A-C depict exemplary images of portions of a scalar element.
Figure 4B:
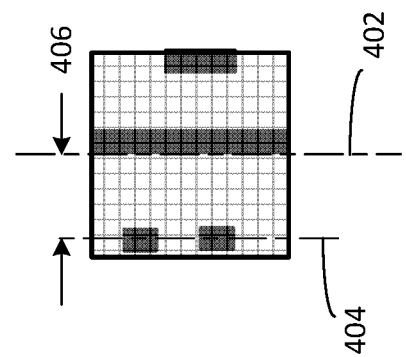
Figure 4A:
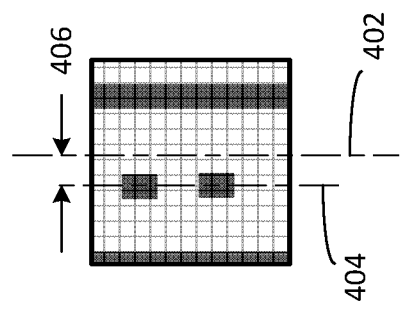

FIGS. 3A-C depict exemplary portions of a scalar element as viewed by the measuring device. FIGS. 3A-C represent an exemplary optical field of view, which is typically larger than the side of the image produced by the camera sensor. FIGS. 4A-C depict images of the portion of the scalar element produced by the measuring device. The images depicted in FIGS. 4A-C correspond to the portions of the scalar element depicted in FIGS. 3A-C.

As shown in FIGS. 3A-C, the optical field of view of the measuring device 120 is sufficiently large to view at least index line 112 and at least one coded region 114 having a binary code 116. Accordingly, as shown in FIGS. 4A-C, the field of view of the measuring device 120 is sufficiently large to produce an image having pixel data for least one index line 112 and at least one coded region 114 (including binary code 116) regardless of the position of the measuring device 120 with respect to the scalar element 110. In some embodiments, the image is larger and includes three features of the scalar element 110: one index line 112, one coded region 114, and one more feature that is either an index line 112 or a coded region 114. In embodiments that do not include index lines, only the binary code 116 portion of the coded region 114 need be captured in the image.

As shown in FIGS. 4A-C, an image produced by the measuring device 120 is composed of a two-dimensional array of pixels. As explained in more detail below with respect to process 1000, image processing may be performed on the image to improve the quality of the pixel data. For example, a threshold filter or other image processing technique may be applied to the acquired image to convert the image into an array of black and white (on or off) pixel data. Further processing may be performed to group pixels that represent a feature on the scalar element 110 and to determine the position of the pixel groups within the image.

Within the image, the position information of the pixel groups can be used to improve the precision of the position of the measuring device 120 with respect to the scalar element 110. For example, as shown in FIGS. 4A-C, the center of a pixel group 404 can be determined by averaging the location of pixels within the group along an axis of the image. The center of the image 406 can also be determined. Using the center of the pixel group 404 and the center of the image 406, an offset 406 between the coded region and the optical center of the measuring device 120 can be determined. The offset 406 can then be added or subtracted from the absolute position indicated by the coded region to improve the precision of the measurement. The same technique can be applied to pixel groups that represent a coded region and pixel groups that represent an index line.

In the present embodiment, the index lines 112 have a width of approximately 0.1 mm and are spaced approximately 0.7 mm apart. The binary code 116 includes binary elements that are approximately 0.1 mm wide and are also spaced approximately 0.7 mm apart. The binary elements of the binary code are arranged along a direction that is perpendicular to the axis of motion between the scalar element 110 and the measuring device 120. More generally, the coded region typically includes information that is encoded along a direction perpendicular to the axis of motion. In the present embodiment, the information is encoded only along a direction that is perpendicular to the axis of motion.

Figure 7:
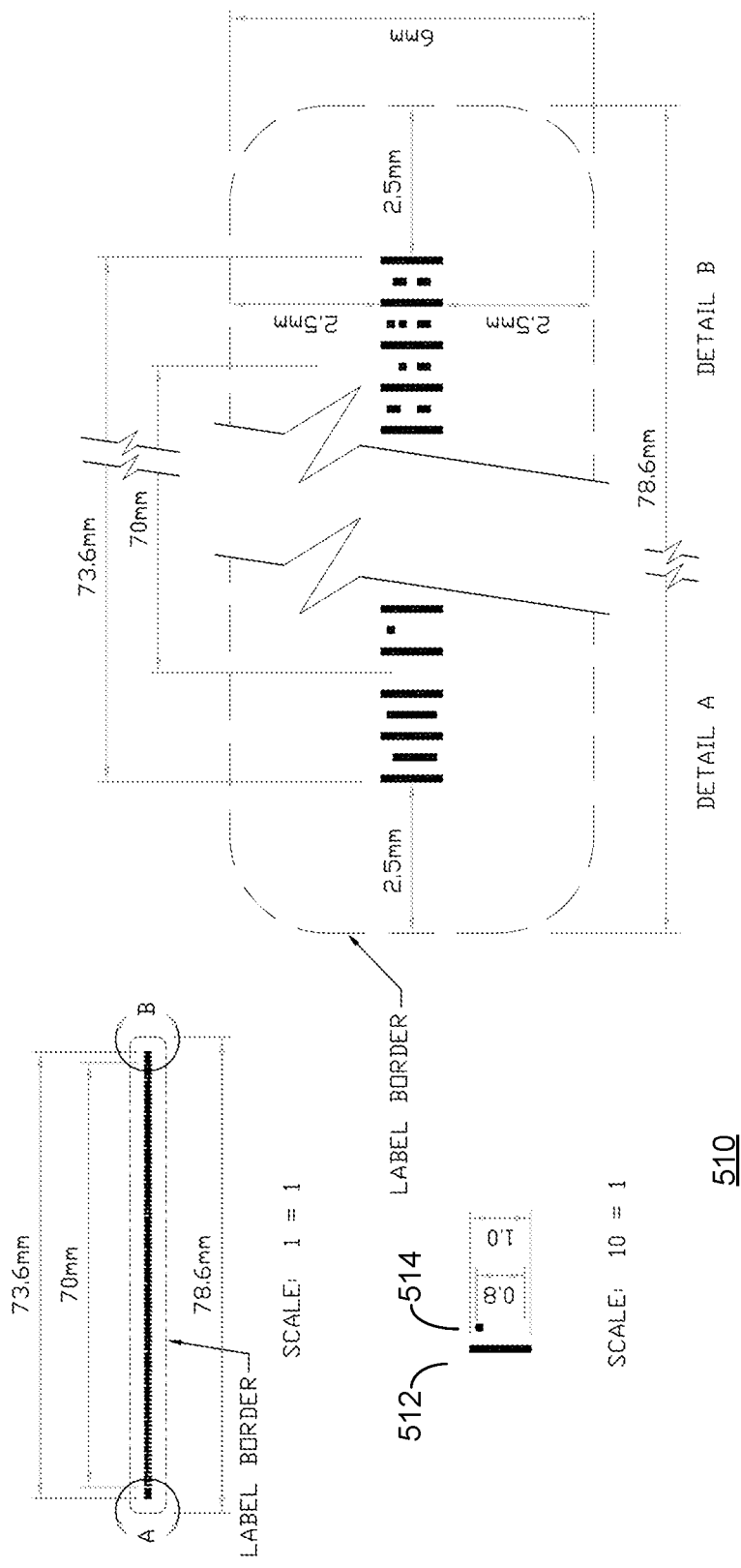
FIG. 7 depicts exemplary dimensions of a scalar element.

FIG. 7 depicts other exemplary dimensions for an exemplary scalar element 710. A full view of the scalar element 510 is depicted on the left hand of FIG. 7 and indicates a 70 mm working length of the scalar element 510 that include index lines 512 and coded regions 514. The two detail views (Detail A and Detail B) depict left and right portions of the scalar element 510, respectively. As shown in FIG. 7, the index line 512 is 1 mm long and the coded region is 0.8 mm long.

With respect to FIGS. 2, 3A-C, and 7, the position of the binary elements within the coded region represents the bit location within an 8 bit word. The color of the binary element represents the bit value (0 or 1) for the corresponding bit location. For example, the top or first location represents first bit in the word. A binary element in the first location indicates a binary value of 1 for the first bit and a binary element in the second element represents a binary value of 1 for the second bit and so on. FIG. 9 depicts a table showing an exemplary binary coding scheme using a graphical representation of binary numbers in a sequence. The example in FIG. 9 uses a graphical binary element placed in one of 8 locations to create an 8-bit coding scheme. Additional bits could be accommodated by expanding the number of locations or by using color-coded elements, as described in more detail below with respect to FIG. 5.

As described in more detail below with respect to process 1000, the index lines and the coded regions can both be used to determine an absolute position along the scalar element. Specifically, the coded region represents a number value indicating the number of index lines from a known location on the scalar element. As previously mentioned, the position of the index lines within the image allows the system to determine a precise position of the measuring device with respect to the scalar element by indicating the relative location of the coded region within the image. Combining the information provided by the coded region with the information provided by the location of the index lines, the system can determine the absolute position of the measuring device with respect to the scalar element. As noted above, in some embodiments, the absolute position can be determined using only the coded region without reference to index lines.

The coded region and the index lines can also be used together to produce rapid position feedback between the first and second objects. For example, the index lines can be used to count the number of steps during a rapid motion between the two objects. The count of the number of index lines can be used to determine the magnitude of the rapid motion and can be used as position feedback for a motion control system, for example. The coded region can then be used near the end or at the end of the movement to verify or correct the magnitude of the rapid motion and provide an absolute position of the second object with respect to the first object.

By having the coding regions encoded with information along a direction that is perpendicular to the axis of motion, additional advantages may be utilized. Specifically, the coded regions can be used to count the number of steps as described above with respect to the index lines. Accordingly, the coded region can serve a dual role as both an indicator for counting relative motion and as a representation of the absolute location.

Figure 5:
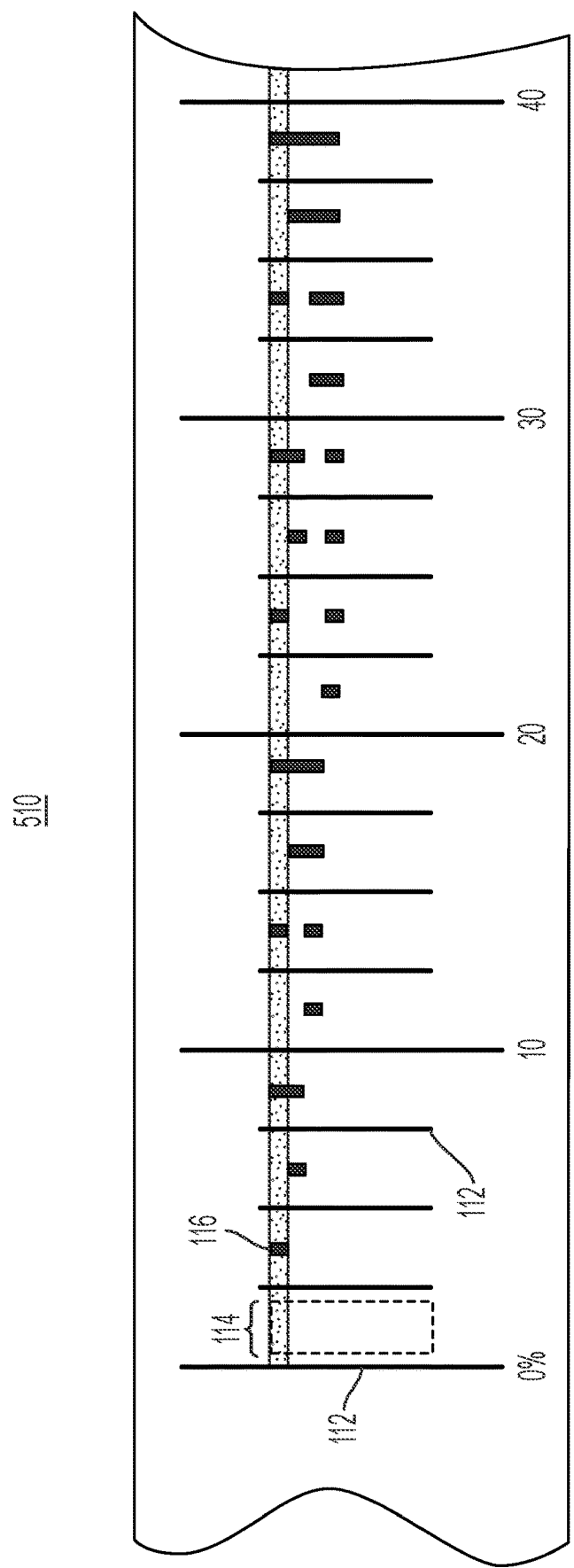
FIG. 5 depicts another exemplary embodiment of a scalar element.

In an alternative embodiment, the measuring device may include a color camera sensor and the scalar element may include one or more color-coded regions that provides additional information about the location of the coded regions with respect to a known location on the scalar element. FIG. 5 depicts another exemplary scalar element 510. As shown in FIG. 5, the scalar element 510 includes a color-coded region 118 that, together with other portions of the coded regions 114, represents a number indicating the number of index lines from a known location on the scalar element. For example, the color of the color-coded region 118 may indicate an additional bit of information used to determine the number represented by the coded regions 114.

The location of the color-coded regions 118 may provide additional information used to determine the distance from the home position. For example, the position of the color-coded region 118 may designate additional bits of information that can be used to determine the number of units of distance from the home position. The color-coded region may be a portion of the coded region or the entire background color of the coded region, or both.

In the embodiment of FIG. 5, the color coded region 118 is aligned with the first binary bit. One can obtain a full extra eight bits of information by moving the region around, adding regions and/or expanding the region. In this regard, the color regions could be laid out in much the same way as the bits are shown in the table in FIG. 9. For example, decimal 5 would include color strips aligned with the location corresponding to the first and third binary bits, while decimal 7 could include a broad color strip aligned with the location corresponding to the first three binary bits.

The above concept can be expanded to include stripes having different colors, such as red, blue, and green. One advantage of using multiple color-coded regions is that the amount of information that can be encoded in the coded region can be significantly expanded. For example, if an n-number of colors are used, the color region can be used to represent n-based number sequences. In this way, the color and location of the one or more color-coded regions can be used to expand the amount of information contained on the scalar element 110 without increasing the width of the scalar element or the field of view of the measuring device 120.

The features described with respect to the measuring device 120 and the scalar element 110 can be used in various combinations to achieve an absolute position of a first object with respect to a second object. In addition, the particular configuration may vary without departing from the nature of the measurement system 100. For example, the scalar element 110 may be attached to the second object 104 and the measurement device 104 may be attached to the first object.

There are multiple implementations of the measuring system described with respect to the embodiments described above that can be used to determine the absolute position of a first object with respect to a second object. For example, the first object may include a base stage element in a gantry robot system. The second object may include a movable armature that is able to traverse with respect to the base stage element. Accordingly, a measurement system in accordance with the embodiments herein can be used to determine an absolute position of the armature with respect to the base stage element. The gantry robot system may include motion controller electronics for controlling motors for moving the armature. The motion controller electronics may use the absolute position of the armature as position feedback for controlling the motion and positioning the armature. As described below with respect to process 1000, the measurement system can be used to calculate an absolute position in real time as the measuring device (or scalar element) is moved, which is advantageous in providing rapid and accurate position feedback to motion controller electronics.

Another exemplary embodiment is described with respect to a bottle dispenser with a digital volume display. A description of a bottle dispenser embodiment is attached as Appendix A and incorporated by reference herein in its entirety. Another description of a bottle dispenser embodiment is attached as Appendix B and incorporated by reference herein in its entirety. A description of the bottle dispenser embodiment is also provided in published application WO/2012/103870 which is incorporated by reference herein in its entirety. In these embodiments, the distance measured by the system is converted into a volume of dispensed fluid.

Figure 6:
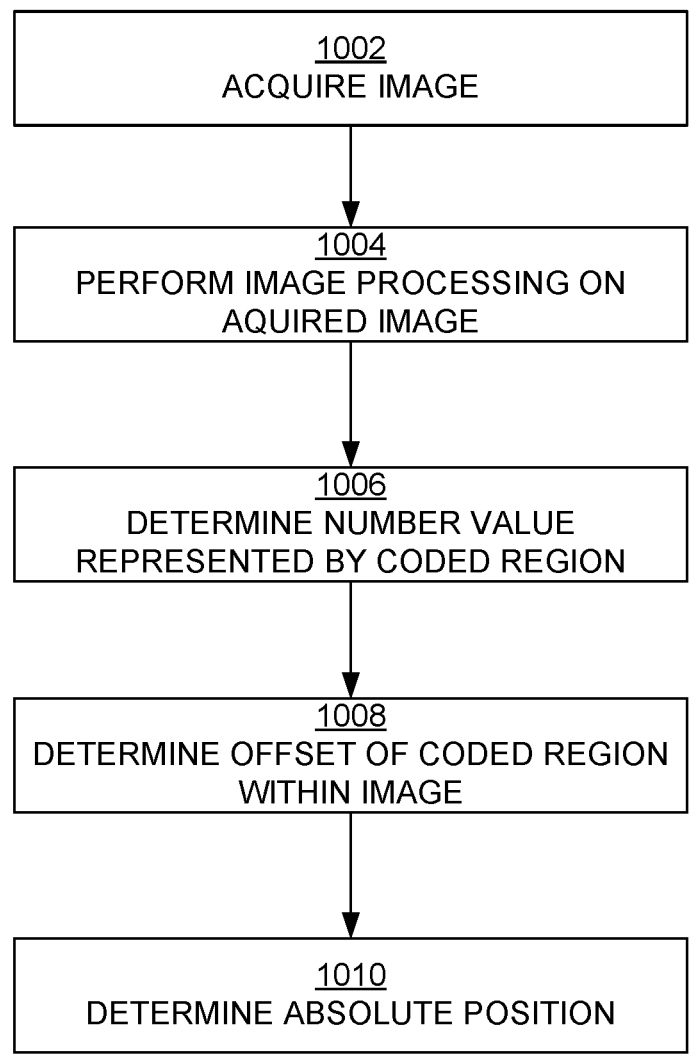
FIG. 6 depicts a method for determining absolute position using a measuring device and a scalar element.

FIG. 6 depicts a flow chart for an exemplary process 1000 for determining absolute position using a measuring device and a scalar element. The process 1000 may be implemented as computer-readable instruction executed on one or more computer processors.

In operation 1002, an image is acquired using the measuring device. As described above with respect to FIGS. 4A-C, the measuring device 120 can be used to produce an image of a portion of the scalar element 110. The image includes at least one coded region 114. In some embodiments the image includes at least one index line 112 and at least one coded region 114.

In operation 1004, image processing is performed on the acquired image. For example, a threshold filter or other image processing technique may be applied to the acquired image to convert the image data to binary values for each pixel in the image. Additional image processing may be performed to determine pixel groups and the shape and location of the pixel groups within the image. The location of the pixel groups may be representative of the location of the index lines and the coded regions of the scalar element with respect to the measuring device.

In operation 1006, the pixel groups of the image representing one or more coded regions is used to determine a number value. As discussed above with respect to FIG. 2, the value may indicate the number of units of distance (or number of index lines of known spacing) from a known or home position on the scalar element. In one example, the coded region includes a binary code having binary elements that are position within the coded region. The number and position of the binary elements can be used to determine the number value.

In operation 1008, an offset of the coded region is determined within the image. As shown in FIGS. 4A-C, the position of the coded region may vary within the captured image. In one example, one or more pixel groups in the image may represent one or more index lines and can be used to determine the center of the pixel group representing the coded region within the image. This position information can be used, for example, to determine an offset between the center of the coded region and the center of the image.

In operation 1010, an absolute position is determined using the number and the position of the coded region within the image. For example, the value may represent the number of units of distance (or the number of index lines of known spacing) from a known position along the scalar element. By multiplying the number of units times the known distance or spacing between coded regions, an absolute position of measuring device can be determined. The accuracy of the absolute position can then be improved by, for example, adding (or subtracting) the offset between the center of the coded region and the center of the image determined in operation 1008.

Process 1000 is typically repeated as the measuring device and the scalar element are moving with respect to each other. In some embodiments, a plurality of images are captured as the measuring device and the scalar element are moving with respect to each other. By processing multiple captured images, the absolute position can be calculated in real time as the measuring device and the scalar element are moving with respect to each other.

As previously mentioned, in some cases, the absolute position is provided to a motion control system as position feedback. In some cases the absolute position is displayed to a user on, for example, a digital read out display or a computer monitor display.

The measurement system 100 described with respect to FIG. 1 can set to produce a position with respect to a home or reference position that does not coincide with the end of the scalar element. For example, the second object 104 may be moved to one end of the range of travel. A proximity switch or hard stop can be used to determine the home or reference location. The position of the second object 104 may be set to zero at this location. The absolute position may be determined using, for example, process 1000 described above. The difference between the reference position zero and the absolute position zero can be stored and added (or subtracted) from subsequent measurements of absolute position to determine a distance from the home or reference position.

The measurement system 100 described with respect to FIG. 1 can also be calibrated to provide a repeatable task or motion. For example, the second object may be attached to a piston used to deliver a quantity of liquid. To calibrate the system, the second object may be moved to a first position where the piston motion should begin. The second object is then moved to a second position where the piston motion should end. The amount of liquid displaced or dispensed by the piston can be measured and the absolute positions of the first and second position can be stored. A simple linear relationship can then be determined between absolute position and the amount of liquid displaced or dispensed by the piston.

A more detailed discussion of such a system is provided in a description of a bottle dispenser embodiment that is attached as Appendices A and B.

Figure 8:
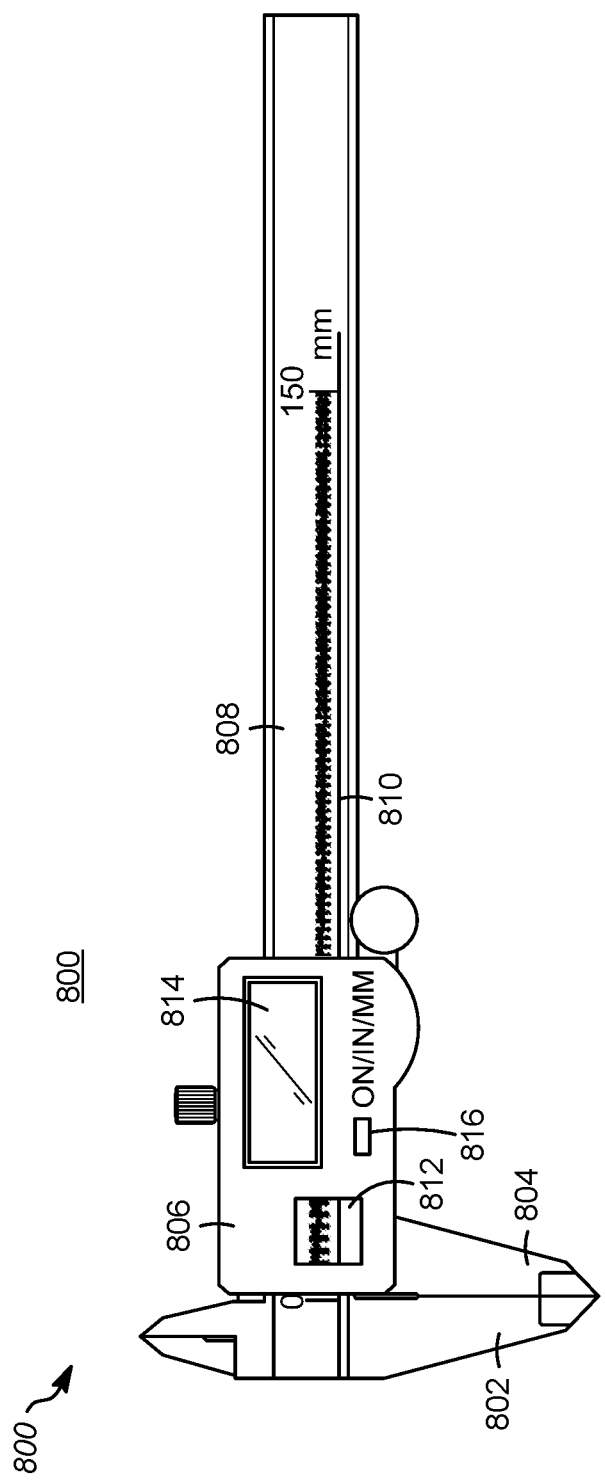
FIG. 8 depicts an exemplary caliper.

FIG. 8 is an illustration of a caliper 800 modified using the position detection system of the subject invention. The caliper includes a pair of jaws 802 and 804. When the jaws are opened to obtain a measurement, the left jaw 802 remains stationary and the right jaw 804 moves the right. This movement causes the position detection electronics housing 806 to move to the right over stationary ruler 808. Ruler 808 includes a scalar element 810. As in the previous embodiments, the scalar element will include a series of coded regions. The scalar element can also include index marks.

Housing 806 includes a camera 812 aligned with the scalar element 810. As in the previous embodiments, in order to determine the spacing of the caliper jaws, the camera obtains an image of the coded region. The coded region provides information about the distance from the start or home position. Any of the various approaches for encoding of the coded region discussed above can be used. For example, the coded regions can be in the form of actual distances from the home position or can be a number which is multiplied by a fixed distance.

In the illustrated embodiment, housing 806 includes a display 814 to show the distance from the home position (jaws closed). A single switch 816 is provided for turning on the electronics and for toggling between inches and millimeters in the display.

A ten bit binary encoding system would provide over 1000 unique binary codes spaced apart at 0.1 mm to cover 100 mm caliper separation. Adding index lines can double that range. Various approaches for printing these type of closely spaced codes can be used including lithographic printing. As in the previous embodiments, the location of the coded region within the two dimensional image generated by the camera can be used to provide position information with a higher resolution than the spacing between the coded regions.

It is envisioned that during the final manufacturing steps, the device will be subjected to a one time calibration procedure. Specifically, the jaws will be placed in the closed position and the aligned coded region (which is preferably spaced from the end of the scalar element) is detected. The detected coded region will become the effective home position and will be uploaded to the software in the processor (not shown) in the housing. This value would then be subtracted from the any value measured by the system when the jaws are separated.

What is claimed is:

1. A measurement system for measuring the absolute position of a first object with respect to a second object along an axis of motion representing a direction of relative motion between the first object and the second object, the system comprising:
   a scalar element attached to the first object, the scalar element comprising a series of coded regions positioned along an axis of the scalar element, wherein the axis of the scalar element is parallel to the axis of motion, wherein:
      each coded region of the series of coded regions comprises a respective pattern of a series of patterns,
      each pattern of the series of patterns is formed on and along a respective line along which pattern information is encoded, wherein the respective line along which pattern information is encoded is perpendicular to the axis of motion, and
      variation of each of the respective patterns on and along the respective lines encodes information that represents a number designating a position of the respective line along the axis of the scalar element;
   a measuring device attached to the second object, the measuring device comprising a two-dimensional optical sensor array configured to capture an image of a portion of the scalar element, the image comprising pixel data of a first pattern in one coded region of the series of coded regions; and
   a processor configured to:
      receive the image; and
      determine an absolute position of the first object with respect to the second object based on the first pattern and based on an image position of the pixel data of the first pattern in the image,
      wherein the image position of the pixel data of the first pattern is in a direction perpendicular to the direction of the respective line along which pattern information is encoded.

2. The measurement system of claim 1, wherein each pattern of the series of patterns comprises a binary code that represents a respective number designating a respective position along the axis of the scalar element.

3. The measurement system of claim 1, further comprising a display configured to display the absolute position.

4. The measurement system of claim 1, further comprising a motion controller configured to receive the absolute position, and to cause a movement of the first object along the axis of motion based on the received absolute position.

5. The measurement system of claim 1, wherein
the measuring device is configured to capture a plurality of images as the first or second object move along the axis of motion, and
the processor is configured to determine, in real time, a respective absolute position for each of the plurality of images.

6. The measurement system of claim 1, wherein:
each coded region of the series of coded regions comprises a respective colored region, and
the processor is further configured to determine the absolute position of the first object with respect to the second object based on a first colored region included in the one coded region comprising the first pattern.

7. The measurement system of claim 1, wherein:
each coded region of the series of coded regions comprises a respective plurality of colored regions, and
the processor is further configured to determine the absolute position of the first object with respect to the second object based on a first plurality of colored regions included in one coded region comprising the first pattern.

8. The measurement system of claim 1, wherein the two-dimensional optical sensor array is a camera sensor.

9. The measurement system of claim 1, wherein the scalar element attached to the first object further comprises a series of regularly repeating optically readable index lines positioned along the axis of the scalar element.

10. The measurement system of claim 9, wherein the image of the portion of the scalar element comprises a first index line, a first coded region, and an additional feature that is either a second index line or a second coded region.

11. A method of determining absolute position of a first object with respect to a second object along an axis of motion representing a direction of relative motion between the first object and the second object, the method comprising:
acquiring an image of a portion of a scalar element attached to the first object using a measuring device attached to the second object, wherein:
the scalar element comprises a series of coded regions positioned along an axis of the scalar element, wherein the axis of the scalar element is parallel to the axis of motion,
each coded region of the series of coded regions comprises a respective pattern of a series of patterns,
each pattern of the series of patterns is formed on and along a respective line along which pattern information is encoded, wherein the respective line along which pattern information is encoded is perpendicular to the axis of motion,
variation of each of the respective patterns on and along the respective lines encodes information that represents a number designating a position of the respective line along the axis of the scalar element; and
the measuring device comprises a two-dimensional optical sensor array configured to capture an image of a portion of the scalar element; the image comprising a first pattern in one coded region of the series of coded regions;
performing image processing on the acquired pixel data of image to obtain a representation of the one coded region;
determining a number value represented by the representation of the one coded region, wherein the number value defines the absolute position of the first pattern along the axis of the scalar element based on the information encoded by the first pattern;
determining the absolute position of the first object with respect to the second object along the scalar element based on the number value and based on an image position of the pixel data of the first pattern in the image, wherein the image position of the pixel data of the first pattern is in a direction perpendicular to the direction of the respective line along which pattern information is encoded.

12. The method of claim 11, further comprising displaying the absolute position on a display.

* * * * *